United States Patent
Houchi

(10) Patent No.: US 7,925,609 B2
(45) Date of Patent: Apr. 12, 2011

(54) INFORMATION PROCESSING APPARATUS, INFORMATION PROCESSING SYSTEM, INFORMATION PROCESSING METHOD, AND COMPUTER READABLE STORAGE MEDIUM

(75) Inventor: Katsunori Houchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 649 days.

(21) Appl. No.: 11/939,708

(22) Filed: Nov. 14, 2007

(65) Prior Publication Data

US 2009/0125472 A1    May 14, 2009

(30) Foreign Application Priority Data

Jan. 25, 2007 (JP) ................. 2007-014482

(51) Int. Cl.
G06F 17/00 (2006.01)
G06N 5/02 (2006.01)
(52) U.S. Cl. ........................................................ 706/50
(58) Field of Classification Search ...................... 706/50
See application file for complete search history.

(56) References Cited

U.S. PATENT DOCUMENTS

| | | |
|---|---|---|
| 5,671,428 A | 9/1997 | Muranaga et al. |
| 5,801,648 A | 9/1998 | Satoh et al. |
| 5,806,078 A | 9/1998 | Hug et al. |
| 5,897,643 A | 4/1999 | Matsumoto |
| 5,940,617 A | 8/1999 | Tamura |
| 5,940,830 A | 8/1999 | Ochitani |
| 5,983,241 A | 11/1999 | Hoshino |
| 6,094,654 A | 7/2000 | Van Huben et al. |
| 6,289,460 B1 | 9/2001 | Hajmiragha |
| 6,615,253 B1 | 9/2003 | Bowman-Amuah |
| 6,662,230 B1 | 12/2003 | Eichstaedt et al. |
| 7,051,275 B2 | 5/2006 | Gupta et al. |
| 7,086,003 B2 | 8/2006 | Demsky et al. |
| 2002/0035525 A1 | 3/2002 | Yokota et al. |

(Continued)

FOREIGN PATENT DOCUMENTS

CN    1577324    2/2005

(Continued)

OTHER PUBLICATIONS

Akira Suzuki; U.S. Appl. No. 11/753,690, filed on May 25, 2007; Information Processing Apparatus, Information Processing System, and Computer Readable Storage Medium.

(Continued)

*Primary Examiner* — Michael Holmes
(74) *Attorney, Agent, or Firm* — Gauthier & Connors LLP

(57) ABSTRACT

There is provided an information processing apparatus, including a receiving unit that receives a derivational relationship information item designating a document prior to an operation as a parent and a document after the operation as a child, and document attribute of the document after the operation; a derivational relationship storage unit that stores the derivational relationship information item being received; a document attribute storage unit that stores the document attribute being received; and an inference unit that, based on a comparison between document attribute of a document which is a root of a tree structure of derivational relationships of documents represented by derivational relationship information items stored in the derivation storage unit and document attribute of a document included in the derivational relationship information items, infers a document that can be a parent of the root document, the compared document attributes being obtained from the document attribute storage unit.

6 Claims, 14 Drawing Sheets

U.S. PATENT DOCUMENTS

| | | |
|---|---|---|
| 2002/0065812 A1 | 5/2002 | Keith, Jr. |
| 2002/0091651 A1 | 7/2002 | Petrogiannis et al. |
| 2002/0120506 A1 | 8/2002 | Hagen |
| 2002/0154010 A1 | 10/2002 | Tu et al. |
| 2002/0184366 A1 | 12/2002 | Kimoto et al. |
| 2003/0154071 A1 | 8/2003 | Shreve |
| 2003/0159035 A1 | 8/2003 | Orthlieb et al. |
| 2003/0182262 A1 | 9/2003 | Yamamoto et al. |
| 2004/0117363 A1 | 6/2004 | Ohno |
| 2004/0205653 A1 | 10/2004 | Hadfield et al. |
| 2004/0264811 A1 | 12/2004 | Yano et al. |
| 2005/0004885 A1 | 1/2005 | Pandian et al. |
| 2005/0021980 A1 | 1/2005 | Kanai |
| 2005/0071755 A1 | 3/2005 | Harrington et al. |
| 2005/0182785 A1 | 8/2005 | Oswalt |
| 2006/0010097 A1 | 1/2006 | Hashimoto |
| 2006/0047922 A1 | 3/2006 | Johnson et al. |
| 2006/0050648 A1 | 3/2006 | Eydelman |
| 2006/0112139 A1 | 5/2006 | Maple et al. |
| 2006/0122985 A1 | 6/2006 | Yamamoto et al. |
| 2006/0136513 A1 | 6/2006 | Ngo et al. |
| 2006/0161516 A1 | 7/2006 | Clarke et al. |
| 2006/0294152 A1 | 12/2006 | Kawabe et al. |
| 2007/0011211 A1 | 1/2007 | Reeves et al. |
| 2007/0112742 A1* | 5/2007 | Dumais et al. .................... 707/3 |
| 2007/0162441 A1 | 7/2007 | Idicula et al. |
| 2007/0299969 A1 | 12/2007 | Kunitake et al. |
| 2008/0115055 A1* | 5/2008 | Sadovsky et al. ............. 715/255 |
| 2009/0024647 A1 | 1/2009 | Hein |
| 2009/0083831 A1 | 3/2009 | Kanai |
| 2009/0228969 A1 | 9/2009 | Garg et al. |

FOREIGN PATENT DOCUMENTS

| | | |
|---|---|---|
| JP | 62241061 | 10/1987 |
| JP | 6077994 | 3/1994 |
| JP | 7056794 | 3/1995 |
| JP | 8292961 | 11/1996 |
| JP | 9223056 | 8/1997 |
| JP | 11053243 | 2/1999 |
| JP | 11327980 | 11/1999 |
| JP | 2000020377 | 1/2000 |
| JP | 2000347943 | 12/2000 |
| JP | 2001350667 | 12/2001 |
| JP | 2002014978 | 1/2002 |
| JP | 2002016788 | 1/2002 |
| JP | 3349978 | 9/2002 |
| JP | 2002328865 | 11/2002 |
| JP | 2003058395 | 2/2003 |
| JP | 2003303122 | 10/2003 |
| JP | 2004110692 | 4/2004 |
| JP | 2005135211 | 5/2005 |
| JP | 2005518602 | 6/2005 |
| JP | 2005338935 | 12/2005 |
| JP | 2006024059 | 1/2006 |
| JP | 2006053686 | 2/2006 |
| JP | 2007004649 | 1/2007 |
| KR | 1020060049337 | 5/2006 |
| KR | 1020060092859 | 8/2006 |
| WO | 03073272 | 11/2007 |

OTHER PUBLICATIONS

Kawabe et al.; U.S. Appl. No. 11/748,626, filed on May 15, 2007; Document Providing System and Computer-Readable Storage Medium.

Kunitake et al., U.S. Appl. No. 11/671,519, filed on Feb. 6, 2007; Document Management Server, Method, Storage Medium And Computer Data Signal, And System For Managing Document Use.

Masao Nukaga, U.S. Appl. No. 11/839,715, filed on Aug. 16, 2007; Information Processing Apparatus, Information Processing System, Information-Processing Method, Computer-Readable Medium, And Computer Data Signal.

Setsu Kunitake, U.S. Appl. No. 11/942,943, filed on Nov. 20, 2007; Information Processing Apparatus, Information Processing System, And Storage Medium.

Office Action issued on Feb. 21, 2009 from the Chinese Patent Office for corresponding Chinese Patent Application No. 200710005902.4, with English translation.

US Office Action issued in connection with U.S. Appl. No. 11/753,690, mailed on Nov. 5, 2009.

US Office Action issued in connection with U.S. Appl. No. 11/282,022, mailed on Dec. 11, 2009.

US Office Action issued in U.S. Appl. No. 11/942,943 mailed on Jan. 19, 2010.

Korean Office Action with partial translation, mailed on Dec. 2, 2008, corresponding to Korean Patent Application No. 10-2007-0058939.

Stoica et al., "A Scalable Peer-to-peer Lookup Service for Internet Applications"; MIY Laboratory for Computer Science; Aug. 27-31, 2001. San Diego, CA; pp. 1-12.

Office Action for U.S. Appl. No. 11/282,022, filed on Nov. 17, 2005; Shigehisa Kawabe; Document Management Server, Document Management System, Computer Readable Recording Medium, Document Management Method, Client of Document Management System, and Node.

U.S. Appl. No. 11/282,022, filed on Nov. 17, 2005, Kawabe et al., "Document Management Server, Document Management System, Computer Readable Recording Medium, Document Management Method, Client of Document Management System, and Node".

U.S. Appl. No. 11/939,708, filed Nov. 14, 2007, Katsunori Houchi; "Information Processing Apparatus, Information Processing System, Information Processing Method, And Computer Readable Storage Medium".

Taro Yoshihama; U.S. Appl. No. 12/055,530, filed on Mar. 26, 2008 for "Document Management Apparatus, Document Management System And Method, And Computer-Readable Medium".

Taro Takashima; U.S. Appl. No. 12/112,211, filed on Apr. 30, 2008 for "Information Processing Apparatus, Information Processing System, Storage Medium, Information Processing Method, and Data Signal".

Office Action for U.S. Appl. No. 11/753,690, mailed on May 28, 2009.

Office Action for U.S. Appl. No. 11/671,519, mailed on Jun. 2, 2009.

U.S. Office Action issued in U.S. Appl. No. 12/112,211 mailed on Aug. 31, 2010.

Tedjini, Mohamed et al. "A Query Service for a Software Engineering Database System," ACM 1990, pp. 238-248.

U.S. Office Action issued in U.S. Appl. No. 11/839,715 mailed on Oct. 7, 2010.

US Office Action issued in U.S. Appl. No. 11/942,943 mailed on Jun. 7, 2010.

US Office Action issued in U.S. Appl. No. 11/748,626 mailed on Jun. 10, 2010.

US Office Action issued in U.S. Appl. No. 11/282,022 mailed on Jul. 6, 2010.

Office Action issued in connection with U.S. Appl. No. 11/753,690 mailed on Jan. 3, 2011.

Office Action issued in connection with U.S. Appl. No. 11/748,626 mailed Nov. 26, 2010.

English translation of Office Action issued in connection with Japanese Patent Application No. 2005-185934 corresponding to U.S. Appl. No. 11/282,022 mailed on Nov. 16, 2010.

* cited by examiner

| MANAGEMENT ID | PARENT ID | OPERATION TYPE | OPERATOR | TIME AND DATE | TREE NUMBER | NODE NUMBER |
|---|---|---|---|---|---|---|
| DOC 1 | NONE | REGISTRATION | USER 1 | 2006-09-12T15:00Z | 0 | 0 |
| DOC 2 | DOC 1 | UPDATE | USER 2 | 2006-09-12T17:15Z | 0 | 1 |
| DOC 3 | DOC 2 | VIEW | USER 3 | 2006-09-13T14:20Z | 0 | 2 |
| DOC 4 | DOC 2 | UPDATE | USER 2 | 2006-09-13T18:40Z | 0 | 3 |
| DOC 5 | DOC 1 | VIEW | USER 1 | 2006-09-20T12:00Z | 0 | 4 |
| DOC 6 | NONE | REGISTRATION | USER 1 | 2006-09-20T13:30Z | 1 | 0 |
| DOC 7 | DOC 6 | VIEW | USER 3 | 2006-09-22T15:00Z | 1 | 1 |
| DOC 8 | DOC 6 | UPDATE | USER 4 | 2006-09-24T17:30Z | 1 | 2 |
| DOC 9 | DOC 8 | UPDATE | USER 4 | 2006-10-03T08:00Z | 1 | 3 |
| DOC 10 | DOC 8 | VIEW | USER 4 | 2006-10-03T21:00Z | 1 | 4 |
| ... | ... | ... | ... | ... | ... | ... |

Fig. 5

| MANAGEMENT ID | CONTENT ID |
| --- | --- |
| DOC 1 | Content1 |
| DOC 2 | Content2 |
| DOC 3 | Content3 |
| DOC 4 | Content4 |
| DOC 5 | Content5 |
| DOC 6 | Content6 |
| ... | ... |

Fig. 6

TREE 0

TREE 1

| MANAGEMENT ID | TREE NUMBER | NODE NUMBER | DOCUMENT ATTRIBUTE | | |
|---|---|---|---|---|---|
| | | | FILE PATH NAME | TIME AND DATE OF CREATION | CREATOR |
| DOC 1 | 0 | 0 | /home/user/specification.html | 2006-09-12T15:00Z | USER 1 |
| DOC 2 | 0 | 1 | /home/user/specification.html | 2006-09-12T17:15Z | USER 2 |
| ... | ... | ... | ... | ... | ... |
| DOC 5 | 0 | 4 | /home/user/specification_v2.html | 2006-09-20T12:00Z | USER 1 |
| DOC 6 | 1 | 0 | /home/user/specification_v2.doc | 2006-09-20T13:30Z | USER 1 |
| ... | ... | ... | ... | ... | ... |
| DOC 9 | 1 | 3 | /home/user/specification_v2.doc | 2006-10-03T08:00Z | USER 4 |
| DOC 10 | 1 | 4 | /home/user/specification_v2.doc | 2006-10-03T21:00Z | USER 4 |

Fig. 8

| MANAGEMENT ID | TREE NUMBER | NODE NUMBER | PARENT NODE NUMBER | PSEUDO PARENT NODE DESCRIPTION | PSEUDO CHILD TREE NUMBER | PSEUDO DERIVATIONAL RELATIONSHIP FLAG |
|---|---|---|---|---|---|---|
| ... | ... | ... | ... | ... | ... | ... |
| DOC 5 | 0 | 4 | | - | 1 | FALSE |
| DOC 6 | 1 | 0 | -1 | TREE:0, NODE:4 | - | TRUE |
| ... | ... | ... | ... | ... | ... | ... |

Fig. 9

| MANAGEMENT ID | TREE NUMBER | NODE NUMBER | DOCUMENT ATTRIBUTE | | | RANK |
|---|---|---|---|---|---|---|
| | | | FILE PATH NAME | TIME AND DATE OF CREATION | CREATOR | |
| DOC 6 | 1 | 0 | /home/user/specification_v2.doc | 2006-09-20T13:30Z | USER 1 | 1 |
| DOC 163 | 56 | 0 | /home/user/specification_v2.doc | 2006-11-22T08:00Z | USER 10 | 2 |
| DOC 978 | 141 | 0 | /home/user/specification_v2.doc | 2007-03-03T21:00Z | USER 38 | 3 |

Fig. 12

INFORMATION PROCESSING APPARATUS, INFORMATION PROCESSING SYSTEM, INFORMATION PROCESSING METHOD, AND COMPUTER READABLE STORAGE MEDIUM

CROSS-REFERENCE TO RELATED APPLICATIONS

This application is based on and claims priority under 35 USC 119 from Japanese Patent Application No. 2007-014482, filed on Jan. 25, 2007.

BACKGROUND

1. Technical Field

The present invention relates to an information processing apparatus, an information processing system, an information processing method, and a computer readable storage medium.

2. Related Art

There has been known technology for registering an electronic document such as text document data, audio data, multimedia data, and so on (hereinafter also referred to simply as a document) in a server and providing the document in response to a user request. Also, a system has been known in which a unique identifier is assigned to an electronic document and an electronic document corresponding to the identifier input by a user is provided. In another known system, when printing an electronic document onto paper, an identifier of the electronic document is encoded and embedded into the paper document, and then, when copying the paper document, the identifier embedded therein is found and decoded to obtain the electronic document corresponding to the identifier, and then the electronic document is used for printing on paper.

SUMMARY

According to an aspect of the invention, there is provided a second information processing apparatus including, a receiving unit that receives from a first information processing apparatus a derivational relationship information item designating a document prior to an operation as a parent and a document after the operation as a child, and document attribute of the document after the operation; a derivational relationship storage unit that stores the derivational relationship information item that is received; a document attribute storage unit that stores the document attribute that is received; and an inference unit that, based on a comparison between document attribute of a document being a root of a tree structure of derivational relationships of documents represented by derivational relationship information items stored in the derivation storage unit and document attribute of a document included in the derivational relationship information items, infers a document that can be a parent document of the document being the root of the tree structure, the compared document attributes being obtained from the document attribute storage unit.

BRIEF DESCRIPTION OF THE DRAWINGS

Exemplary embodiments of the present invention will be described in detail based on the following figures, wherein:

FIG. 5 is a view showing example data content of a derivational relationship DB;

FIG. 6 is a view showing example data indicating correspondence between management IDs and document contents;

FIG. 8 is a view showing example data content of a document attribute DB;

FIG. 9 is a view showing example data content of a pseudo derivational relationship DB;

FIG. 12 is a view showing example data content used in a processing performed by the derivational relationship inference unit;

DETAILED DESCRIPTION

An exemplary embodiment of the present invention will be described in detail with reference to the accompanying drawings.

Figure 1:
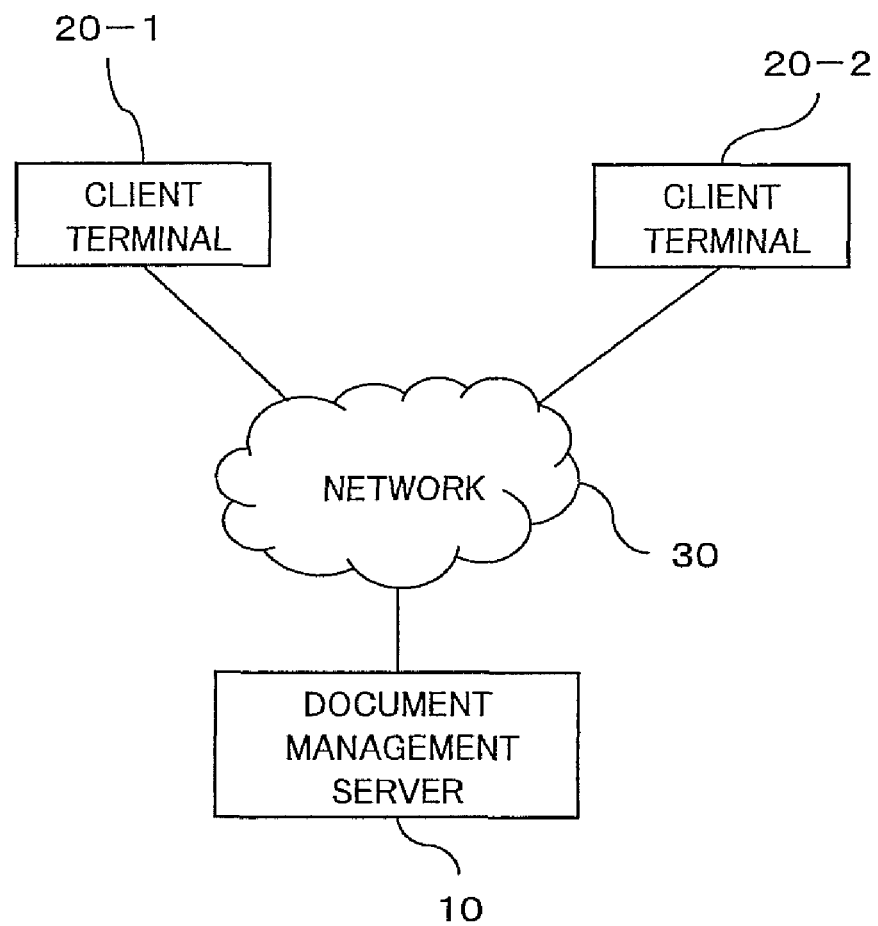
FIG. 1 is a block diagram schematically showing an example structure of a document use management system.

FIG. 1 is a block diagram schematically showing a structure of a document use management system. This system is formed by a document management server 10 and client terminals 20-1, 20-2, . . . (hereinafter collectively referred to as a client terminal 20) connected to each other via a network 30, which may be or include the Internet, a LAN (local area network), and the like.

Figure 2:
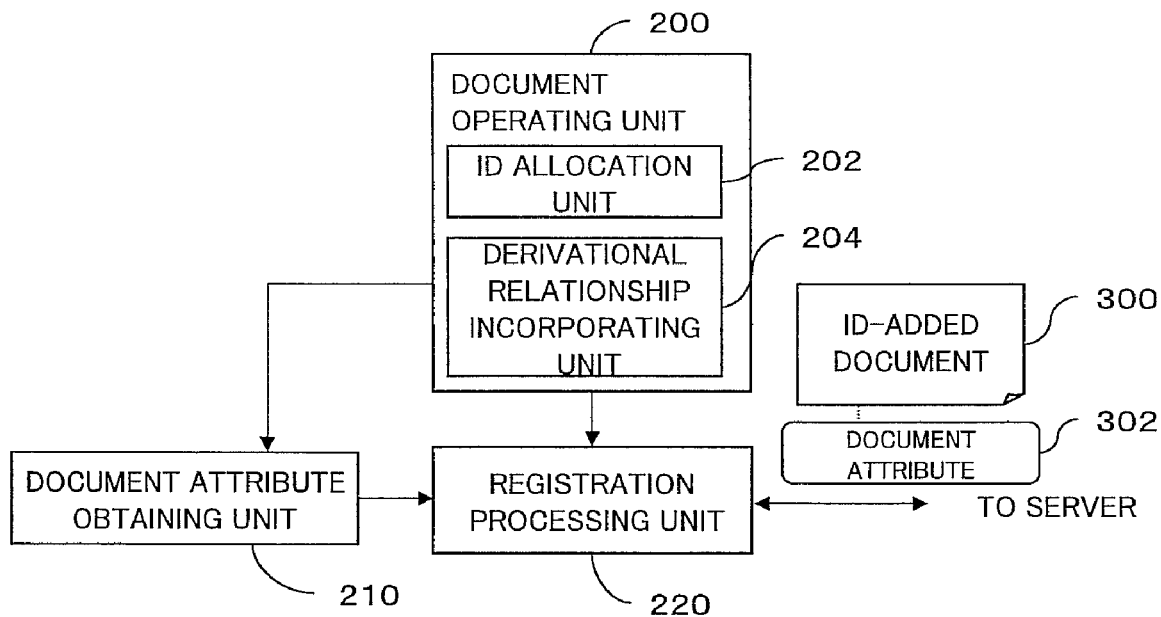
FIG. 2 is a block diagram showing an example internal structure of a client terminal.

The client terminal 20 will be described with reference to FIG. 2. The client terminal 20 is a terminal used by a user for manipulating a document, and may be a personal computer, a digital copying device, and so on. The client terminal 20 includes a document operating unit 200, document attribute obtaining unit 210, and a registration processing unit 220.

The document operating unit 200 is used for performing an operation with respect to a document, including display (i.e. "viewing" by a user), editing, print and output of a document, reading and copying of a paper document, and so on. While only a single document operating unit 200 is shown in FIG. 2, the individual operations may be performed by different operating units (e.g. different applications such as an editing application and a reading control application). If the document operating unit 200 is software used for creating and editing an electronic document, such as a word processor, for example, the document operating unit 200, in accordance with a user's instruction, displays an electronic document or edits the electronic document. The document operating unit 200, when performing an operation with respect to a document, outputs an ID-added document 300 that represents a result of the operation.

Figure 3:
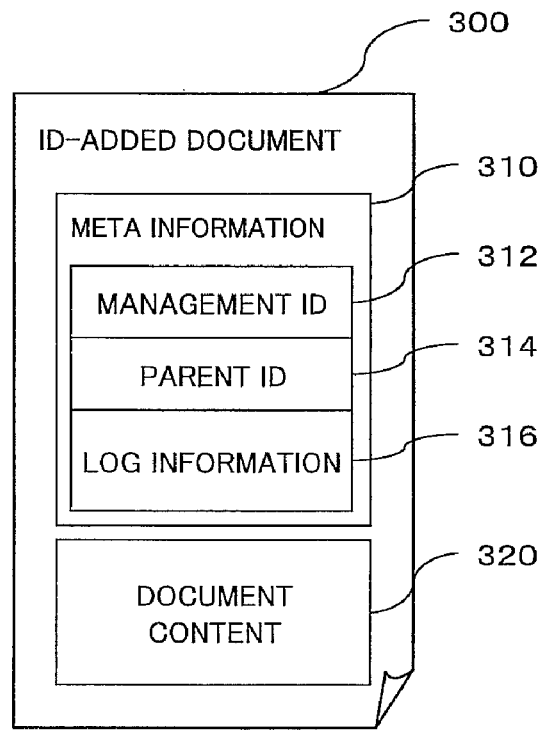
FIG. 3 is a view schematically showing an example data structure of an ID-added document.

As shown in FIG. 3, the ID-added document 300 is an electronic document including meta information 310 and a document content 320. The document content 320 corresponds to content data of a document that is generated as a result of the operation performed by the document operating unit 200. If the document operating unit 200 is software that creates and edits an electronic document, the document content 320 is a document file generated as a result of editing performed by the software. Alternatively, if the document operating unit 200 is a device that prints an electronic document, the document content 320 may be content data of an electronic document to be printed. Further, if the document operating unit 200 is a device that scans a paper document or a device that copies a paper document, the document content 320 may be image data obtained by reading the paper document.

The meta information 310 is information used for document management, and includes a management ID 312, a parent ID 314, and log information 316.

The management ID 312 is unique identification information of an ID-added document 300 itself. The parent ID 314 is a management ID of a parent ID-added document of that ID-added document 300. Specifically, in this exemplary embodiment, a certain ID-added document and a new ID-added document obtained by performing an operation with respect to the certain ID-added document are treated as being in a parent-child relationship. More specifically, when a second ID-added document is obtained by operating a first ID-added document, the first ID-added document is a parent of the second ID-added document, and the second ID-added document is a child of the first ID-added document. For example, when the document operating unit 200 performs an operation with respect to an ID-added document having a management ID "A" and a new ID-added document having a management ID "B" is obtained as a result of the operation, the management ID 312 in the meta information 310 of the latter document is "B" and the parent ID 314 of this document is "A". Such a parent-child relationship will be referred to as a "derivational relationship" (of management IDs).

Here, in a case where an operation of initially registering an electronic document which has not been registered in the present system is performed, and also in a case where an operation of scanning or copying an unregistered paper document is performed (in the latter case, an ID-added document including an image obtained by reading the paper document as its document content is generated and registered in the present system), the ID-added document 300 which is generated would have no parent ID 314 (that is, no parent exits).

The log information 316 refers to information of various log items concerning the operation performed when the ID-added document is generated. The log items may include the time and date when the operation is performed, the type of the operation, a user (operator) who instructs the operation, and so on, and are not limited to these examples. The operation types include, for example, registration (i.e. registration of a new document in the present system), viewing, update (change of document content), printing, scanning, copy of a paper document, and so on. For example, when a user uses the document operating unit 200 to edit a first ID-added document and then instructs completion of editing, the log information 316 of the resulting second ID-added document includes the time of editing completion, identification information of a user who instructed the editing, and the type of operation "update".

Referring back to FIG. 2, the document operating unit 200 includes an ID allocation unit 202 and a derivational relationship incorporating unit 204 so as to generate the ID-added document 300 described above as a result of an operation. The ID allocation unit 202 allocates a unique management ID to an ID-added document generated as a result of an operation. The management ID needs to be identification information that is unique at least within the present system. For example, it is possible to obtain a hash value of an ID-added document 300 (excluding the management ID 312) to be generated as a result of an operation and use the hash value as a management ID of the ID-added document 300. When a collision-resistant cryptographic hash function, such as SHA-256 (which is a cryptographic hash function having a hash value of 256 bits defined in FIPS (Federal Information Processing Standards) 180-2 by the NIST (National Institute of Standards and Technology)), is used as the hash function, a management ID having practically sufficient uniqueness can be generated. As a matter of course, a method of generating a management ID which is unique within the system by each client terminal 20 is not limited to the above example. When the management ID includes identification information that is specific to each client terminal 20, the management ID that is unique within the system can be generated in each client terminal 20.

The derivational relationship incorporating unit 204 generates meta information 310 including a new management ID 312 allocated to a document obtained by a result of an operation by the ID allocation unit 202, a parent ID 314 which is a management ID of a parent document with regard to which the operation has been performed (in the case of initial registration, no such parent ID exists), and log information 316 concerning the operation. The derivational relationship incorporating unit 204 further adds the meta information 310 to the document content of the operation result to thereby generate and output an ID-added document 300 obtained after the operation.

The document attribute obtaining unit 210 obtains document attribute information of a document to be operated by the document operating unit 200. This information, hereafter referred to as a "document attribute" is attribute information regarding the document itself, and differs from the log information 316 concerning the operation performed with respect to the document. The document attribute can be obtained from, for example, software and system functioning independently of the ID allocation unit 202 and derivational relationship incorporating unit 204 included in the document operation unit 200 on the client terminal 20.

Examples of information items that may be included in the document attribute include a file path name indicating a storage location of a storage device in which the document is stored, the time and date of creation of the document, the creator of the document, and so on. Another example item may be a "security policy" defining restrictions on operations performable with respect to the document. The security policy may, for example, provide rules indicating whether or not specific operations (e.g. view, edit) are permitted for specific users. For example, in a case where there are multiple configuration information sets representing different security policies, and wherein one of the configuration information set is associated with a document, identifying information of the configuration information set representing the security policy can be obtained as document attribute of the document. Further, in a case wherein a unique identifier such as UUID (Universally Unique Identifier) can be assigned to a document, this identifier can be used as the document attribute. A UUID is a 128-bit binary number generated by combining the creation time and date of a document file, the MAC (Media Access Control) address of a device by which the document file is created, random numbers, and so on.

The document attribute obtaining unit 210 may obtain the document attribute 302 of the ID-added document 300 being output by the document operation unit 200 from an operating system of the client terminal 20, for example. The operating system of the client terminal 20 manages attribute information with regards to the files operated by the client terminal 20. The attribute information with regards to a file includes, for example, a file path name, a user name of a user who created the file, creation time and date of the file, a security policy, and so on. The document attribute obtaining unit 210 may obtain from the operating system the attribute information of a document file corresponding to an ID-added document 300, the attribute information being managed by the operating system of the client terminal 20, and may consider the obtained attribute information as the document attribute 302 of the ID-added document 300. Further, there may be cases where a document operated on the client terminal 20 is managed by a document management system other than the document operation unit 200, the document attribute obtaining unit 210, and the registration processing unit 220 of the present exemplary embodiment. The client terminal 20 may include such a document management system, or, alternatively, devices such as terminals and servers which are connected to the client terminal 20 via a network 30 may include such a document management system. Generally, such a document management system manages, with respect to a document operated by the client terminal 20, attribute information of the document, such as the creator of the document, creation time and date of the document, updating time and date of the document, information representing updated versions, a security policy, UUID, and so on. When a document to be operated by the client terminal 20 is managed by the above described document management system, the document attribute obtaining unit 210 may obtain document attribute 302 of an ID-added document 300 via a service interface of such a document management system. Further, for example, the document obtaining unit 210 may obtain the document attribute 302 from an application which performs an operation with respect to a document on the client terminal 20. A document operated by the client terminal 20 may have a data format in which the content of the document and the attribute information of the document file (e.g. the file path name, the date and time of creation, and the creator of the file) are included within the document file. For example, a document file which has a data format operated by software for creating/editing an electronic document such as a word processor or has a data format such as PDF (Portable Document Format) includes, within the document file, attribute information of the file in addition to the content of the document. Generally, an application which performs an operation with respect to a document having a data format such that the document file includes therein attribute information of the document file, can extract attribute information of a document file from the document file with respect to which an operation is performed. The document attribute obtaining unit 210 may obtain, with regards to a document file of the ID-added document 300, attribute information that is extracted by such an application which performs an operation with respect to a document, as document attribute 302 of an ID-added document 300. Here, the document operation application which passes the attribute information of the document file to the document attribute obtaining unit 210 may be an application which functions as the document operation unit 200 including the ID allocation unit 202 and the derivational relationship incorporating unit 204 of the present exemplary embodiment. Alternatively, the document operation application may be an application other than the document operation unit 200 such that the application does not have the ID allocation unit 202 and the derivational relationship incorporation unit 204.

The registration processing unit 220 performs processing for registering the ID-added document 300 output from the document operating unit 200 and the document attribute 302 of the ID-added document 300 obtained by the document attribute obtaining unit 210 to the document management server 10. Thus, each client terminal 20 registers the ID-added document 300 obtained as a result of an operation performed by each client terminal 20 itself and the document attribute 302 of the ID-added document 300 to the document management server 10 as described above, so that the document management server 10 can recognize the derivational relationship between each ID-added document 300 and can hold the document attribute 302 of each ID-added document 300. Here, the document attribute 302 of the ID-added document 300 may exist as information separated from the ID-added document 300 or may be included in the ID-added document 300.

The ID-added document 300 output from the document operating unit 200 as a result of an operation can be provided to other users by electronic distribution, as an attachment to an electronic mail message, and so on, similar to cases with general document files. When a user who receives an ID-added document 300 from another user uses the document operating unit 200 of their own client terminal 20 to operate the received ID-added document 300, a new ID-added document to which a new management ID is assigned in accordance with the operation is to be generated.

Further, when printing an electronic document with the document operating unit 200, the document operating unit 200 may generate a management ID and embed the management ID in the printed electronic document. Here, embedding of the management ID can be performed by, for example, superposing a code image representing the management ID with a printed image of the electronic document. In such a case, the document operating unit 200 registers an ID-added document including meta information such as the management ID, the operation type, which is "printing" in this case, and so on, in the document management server 10. Further, when an ID-added document is printed, a new ID-added document including the management ID of the ID-added document as a parent ID 314 is generated. The new ID-added document corresponding to such a printing operation may include, as the document content 320, printing data such as page description language data and bit map image data representing a printed image.

Further, when a paper document having a management ID embedded therein is read by the document operating unit 200, the document operating unit 200 assigns a new management ID with respect to the reading operation, and generates an ID-added document including an image of the reading result as the document content 320 and registers the ID-added document in the document management server 10. The management ID read from the original paper document is set as a parent ID 314 of the ID-added document. At the time of copying a paper document having a management ID embedded therein, both the reading processing and the printing processing described above are to be performed.

Here, it is not always possible to implement all the software that perform operations with respect to a document on the client terminal 20 so as to have functions of the document operation unit 200 described above. For example, in a case wherein multiple document operation units 200 perform operations with respect to documents having different document formats, there may be software code that performs an "operation" as to convert a document having a document format suitable for an operation performed by a certain document operation unit 200 into another document having a document format suitable for an operation performed by another document operation unit 200. It may, however, be difficult to implement the software such that it will function as the document unit 200 that outputs an ID-added document as a document generated as a result of an operation. Examples of such software may include software that converts a document having html (HyperText Markup Language) format into a document having a document format operated by software for creating/editing an electronic document such as a word processor, translation software that converts a content of an electronic document written in a certain language into a content written in another language, and the like. In a case wherein an operation is performed with respect to a document by software of this type (hereinafter referred to as "non-conforming software"), which does not function as the document operation unit 200 and does not output a newly-generated ID-added document as a result of an operation, the document generated as a result of the operation of this software will not be output as an ID-added document. Therefore, when an operation is performed with respect to a document by non-conforming software on the client terminal 20, the registration processing unit 220 does not transmit the document generated as a result of the operation to the document management server 10, and the document generated as a result of the operation will therefore not be registered to the document management server 10. If a user wishes to register a document generated as a result of an operation performed by non-conforming software, the user must, using the document operation unit 200, perform an operation with respect to the document generated as a result of the operation performed by the non-conforming software to "register" this document to the document management server 10 as a new document. In such a case, the document generated as a result of an operation by the non-conforming software will be registered to the document management server 10 as a new document having no parent ID, even when the document prior to the operation with respect to this document is an ID-added document which was already registered to the document management server 10. Therefore, when an operation is performed with respect to an ID-added document by non-conforming software, and the document generated as a result of the operation is registered to the document management server 10, the document management server 10 cannot obtain derivational relationship information for the relationship between the document prior to the operation by the non-conforming software and the document obtained after the operation, although such a relationship does, in fact, exist.

Figure 4:
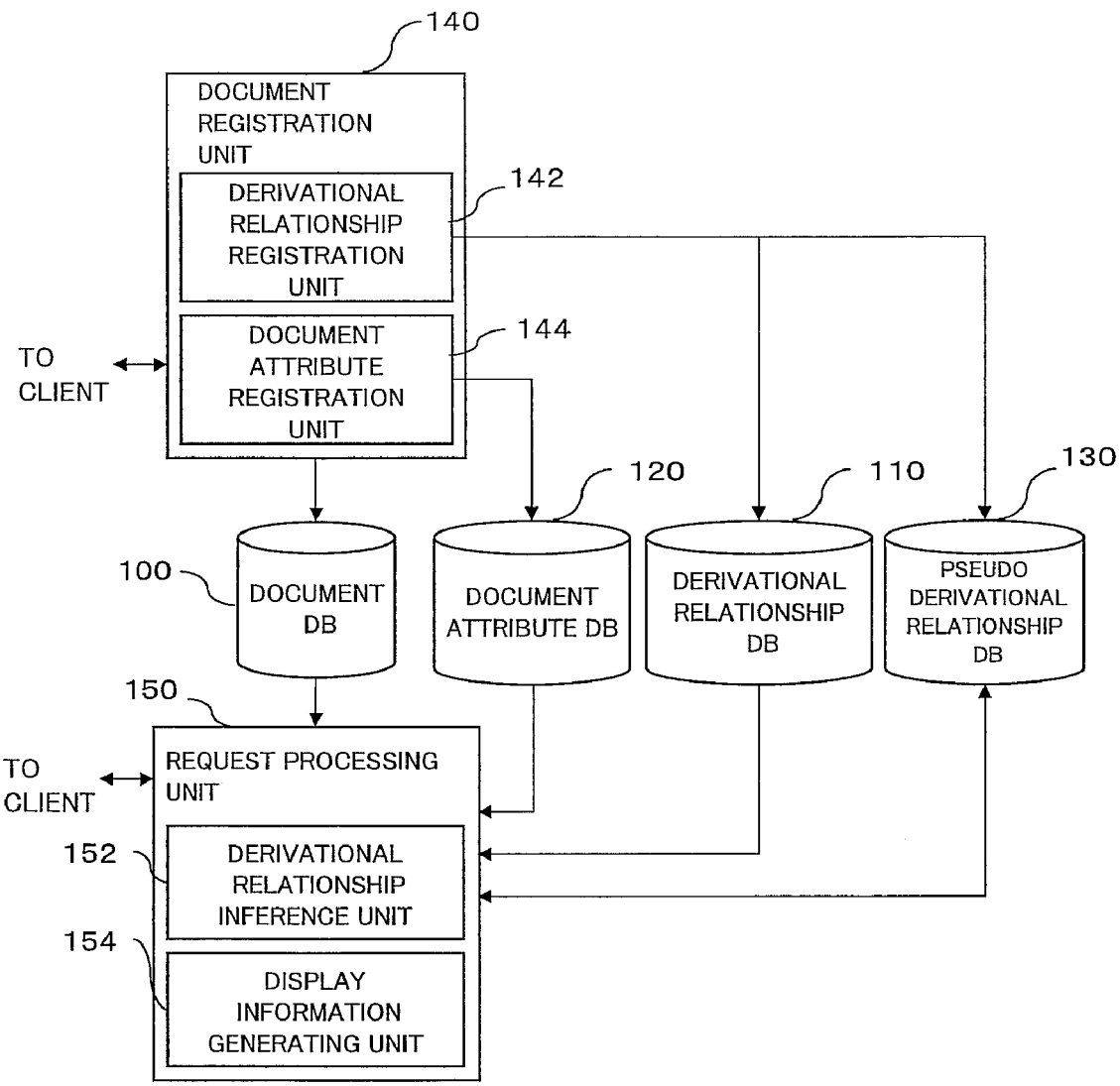
FIG. 4 is a block diagram showing an example internal structure of a document management server.

Referring now to FIG. 4, the document management server 10 will be described. The document management server 10 stores ID-added documents 300 sent from multiple client terminals 20 in the system and provides various services to users based on the stored information. The document management server 10 includes a document DB 100, a derivational relationship DB 110, a document attribute DB 120, a pseudo derivational relationship DB 130, a document registration unit 140, and a request processing unit 150.

The document DB 100 is a database that stores a document content 320 of an ID-added document 300 transmitted from the client terminal 20. Each document content 320 stored in the document DB 100 is managed by using a unique content ID. While a hash value obtained by a cryptographic hash function of the corresponding document content may be used as the content ID, the content ID is not limited to this example.

The content ID may be assigned by the client terminal 20, in which case, the content ID may be included in the meta information 310.

The derivational relationship DB 110 is a database that stores meta information mainly concerning the information of a derivational relationship in such an ID-added document 300. FIG. 5 shows an example data content of the derivational relationship DB 110. The information in one row in the table shown in FIG. 5 represents a meta information record corresponding to one ID-added document 300. In this example, items including a parent ID, an operation type, an operator, an operation time and date, a tree number, and a node number are registered corresponding to the management ID of each ID-added document 300. The information items in the meta information record are not limited to the above example, and any items necessary for the purpose of management can be recorded, as long as the pair of the management ID and the parent ID is included. Further, in the example shown in FIG. 5, a tree number and a node number of tree structures represented by the derivational relationships of the management IDs are also registered corresponding to each management ID. The derivational relationships of the management IDs stored in the derivational relationship DB 110 represent multiple independent tree structures, the roots thereof being multiple "registration" operations. A tree number is identification information to identify the multiple tree structures (trees) and a node number is identification information to identify nodes included in one such tree. In the example shown in FIG. 5, the node number of a node being a root node of a tree structure is set to 0.

Here, FIG. 5 merely expresses the data managed by the derivational relationship DB 110 from a viewpoint of data content, and does not therefore specify any specific expression form or database form. For example, the derivational relationship DB 110 may be configured as a general relational database, or a database in which a XML (extensible Markup Language) document that describes meta information other than the management ID is registered using the management ID as a key.

Additionally, the correspondence between the document content registered in the document DB 100 and the meta information registered in the derivational relationship DB 110 is managed by the correspondence information as shown in FIG. 6. Such correspondence information is obtained by recording the content ID of a document content in association with the management ID. This correspondence information may be stored in the document DB 100 or in the derivational relationship DB 110.

Figure 7A:
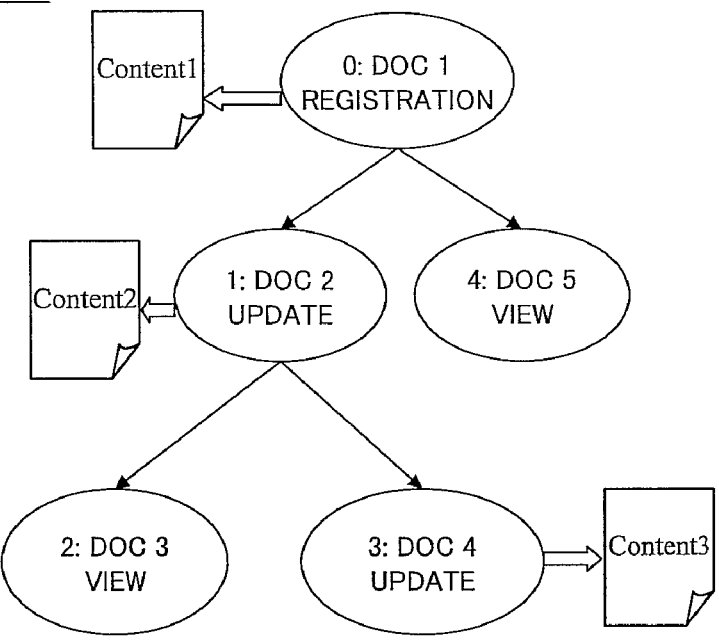
FIGS. 7A and 7B are views diagrammatically showing parts of the derivational relationship indicated by the data contents illustrated in FIG. 5.
Figure 7B:
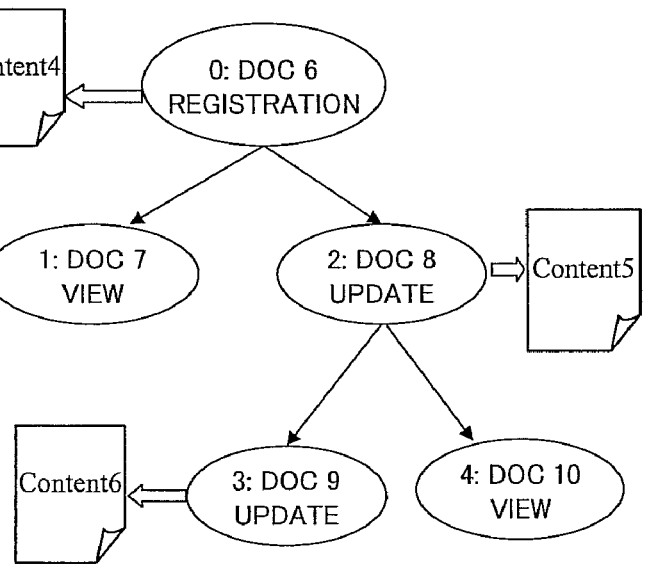

The data content of the derivational relationship DB 110 shown in FIG. 5 forms tree structures as shown in FIGS. 7A and 7B, in which the management IDs are nodes and the parent-child relationships among the management IDs are edges. FIG. 7A shows a tree structure (tree 0) representing the derivational relationships of the documents which have management IDs "Doc1" to "Doc5" in FIG. 5, and FIG. 7B shows a tree structure (tree 1) representing the derivational relationships of the documents which have management IDs "Doc6" to "Doc10" in FIG. 5.

The log of the documents which have management IDs "Doc1" to "Doc5" shown in the example of FIGS. 5 to 7A will be described below in the order in which the processes are performed. First, a "registration" operation of a document which has not been registered in the document management server 10 is performed by the client terminal 20 of a user 1. In response to this operation, an ID-added document "Doc1" including meta information having a management ID "Doc1", no parent ID, and an operation type "registration"; a document content of the ID-added document; and document attribute of the ID-added document "Doc1" are transmitted from the client terminal of the user 1 to the document management server 10. In response, the document management server 10 registers the document content of the ID-added document "Doc1" in the document DB 100, registers the meta information of the document "Doc1" in the derivational relationship DB 110, and registers the document attribute of the document "Doc1" in the document attribute DB 120. The document content thus registered is managed in association with a content ID "Content 1". The ID-added document "Doc1" is then edited ("update") on by a client terminal of a user 2, and as a result of this editing operation, an ID-added document "Doc2" is registered in the document management server 10. Subsequently, a user 3 views the document "Doc2", and an ID-added document "Doc3" as a result of the operation is registered to the document management server 10. Here, the document content of the document "Doc3" is the same as that of the document "Doc2". Further, in response to the editing ("update") operation performed on the ID-added document "Doc2" by the user 2, an ID-added document "Doc4" as a result of the editing is registered to the document management server 10. Further, the ID-added document "Doc1" is viewed by the user 1, and then an ID-added document "Doc5" as a result of the viewing is registered to the document management server 10.

The document attribute DB 120 is a database that stores the document attribute 302 of the ID-added document 300 received from the client terminal 20. FIG. 8 shows an example data content of the document attribute DB 120. The information in one row in the table shown in FIG. 8 represents a document attribute record corresponding to one ID-added document 300. In this example, items including a tree number, a node number, and document attribute are registered corresponding to the management ID of each ID-added document 300. In the example shown in FIG. 8, items including a file path name, time and date of creation, and a creator are registered as the document attribute. Other items may be registered as the document attribute corresponding to the management ID when those items are received from the client terminal 20 as the document attribute. The tree number and the node number can be excluded from the document attribute DB 120 as long as the document ID is associated with the items included in the document attribute.

The pseudo derivational relationship DB 130 is a database that stores derivational relationships between documents inferred by the derivational relationship inference unit 152 that is later described in detail, distinctly from the derivational relationships received from the client terminal 20. FIG. 9 shows an example data content of the pseudo derivational relationship DB 130. Information in one row in the table shown in FIG. 9 represents a record corresponding to one ID-added document 300. In this example, items including a tree number, a node number, a parent node number, a pseudo parent node description, a pseudo child tree number, and a pseudo derivational relationship flag are registered corresponding to each management ID. The parent node number represents a parent node of each node (management ID) by the node number within the tree. The pseudo parent node description describes a tree number and a node number of a node inferred as a node which can be a parent of each management ID by the derivational relationship inference unit 152. The pseudo child tree number describes a tree number with regards to a root node inferred as a node which can be a child of each management ID by the derivational relationship inference unit 152. No pseudo parent description and pseudo child tree are registered when there are no inferred nodes. The pseudo derivational relationship flag is, with regards to a root node of a tree structure, set TRUE when there is a node inferred as a node which can be a parent of the root node, and set FALSE when there is no node inferred. The pseudo derivational relationship DB 130 is not limited to the form shown in FIG. 9 as long as the database associates each management ID, a pseudo parent node inferred with regards to the management ID, and a pseudo child node inferred with regards to the management ID. For example, with respect to the pseudo parent node and the pseudo child node, the management IDs of those nodes may be stored instead of identifying those nodes by the tree number and the node number. Alternatively, for example, the database may have no items other than a management ID, a pseudo parent node, and a pseudo child node. The content associated with each management ID in the pseudo derivational relationship 130 may be stored in the derivational relationship DB 110.

The document registration unit 140 registers the document content, the meta information of an ID-added document received from the client terminal 20, and the document attribute 302 of the ID added document 300 in the document DB 100, the derivational relationship DB 110, and the document attribute DB 120, respectively. Of these registration-operations, registration of the meta information is performed by the derivational relationship registration unit 142 and registration of the document attribute is performed by the document attribute registration unit 144.

The request processing unit 150 provides a service by using the derivational relationship DB 110 and the pseudo derivational relationship DB 120, in response to a service request including the management ID transmitted from the client terminal 20. A service to be provided by the request processing unit 150 may include a service of providing the history of the management ID for which the service is being requested, that is an operation history of the documents from the ancestor up to the management ID (i.e. an information list indicating who performs what kind of operation, and so on). Another example service may be a service of providing a history of operations the documents subsequent to the generation of the management ID for which the service is being requested. Another example service may be providing an ancestor document corresponding to the management ID for which the service is being requested or the log information of the ancestor. Yet another example service may be a search for the latest version of a document corresponding to the management ID for which the service is being requested.

The service request is issued based on an ID-added document held by the client terminal 20. For example, when a user operates the document operating unit 200 of the client terminal 20 to open an ID-added document, the document operating unit 200 provides a service menu using the derivational relationship, receives a user's designation of a desired service among the menu, and transmits a service request including the document ID of the ID-added document and a code indicating the designated service to the request processing unit 150 of the document management server 10.

Alternatively, it is also conceivable to regard a user designation of a service as one "operation", and to assign a new management ID to the "operation". When this is done, it is possible to generate an ID-added document including a code of the designated service as an operation type and the management ID of the original ID-added document that was used at the time of designation of a service as a parent ID, and transmit this ID-added document to the document management server 10 as a service request. In this case, the request processing unit 150 determines a service to be provided based on the information of an operation type in the ID-added document that is received and uses the parent ID of that ID-added document as a start point when tracing back the derivational relationship.

The request processing unit 150, when receiving a service request from the client terminal 20, traverses a tree configured by the derivational relationship between the management IDs and the parent IDs registered in the derivational relationship DB 110 and the pseudo derivational relationship DB 130, and uses the information obtained as a result of the traversal to perform the service requested by the user.

In the present exemplary embodiment, the request processing unit 150 includes a derivational relationship inference unit 152 and a display information generating unit 154. The derivational relationship inference unit 152, when receiving a service request by the client terminal 20, performs a processing to infer a node which can be a child or a parent of a node included in a tree to which the management ID for which the service being requested belongs, among nodes included in trees other than the tree to which the management ID for which the service is being requested belongs. The display information generating unit 154, when receiving a service requesting provision of a history of a document corresponding to a designated management ID from the client terminal 20, refers to the derivational relationship DB 110 and the pseudo derivational relationship DB 130, generates display information to be displayed by the client terminal 20, and transmits the generated display information to the client terminal 20. The details of the processing performed by the derivational relationship inference unit 152 and the display information generating unit 154 are described below.

The content of processing to be performed by the system of the present exemplary embodiment will now be described in detail. First, an example processing procedure of the client terminal 20 when an operation is performed with respect to a document will be described. When an operation is performed with respect to a document, the document operating unit 200 generates a management ID with respect to a document obtained as a result of the operation. The document operating unit 200 then obtains various information concerning the operation from an operating system and other systems to generate meta information, and generates an ID-added document including the meta information and the document content obtained after the operation, and further provides the ID-added document to the document attribute obtaining unit 210 and the registration processing unit 220. The document attribute obtaining unit 210, with regards to the ID-added document received from the document operation unit 200, obtains attribute information of the document from an operating system and other systems other than the document operating unit 200 of the client terminal 20, and passes the obtained attribute information to the registration processing unit 220 as the document attribute of the ID-added document received from the document operation unit 200. The registration processing unit 220, upon receiving the ID-added document from the document operating unit 200 and the document attribute of the ID-added document, registers the ID-added document and the document attribute of the ID-added document with the document management server 10.

An example procedure executed by the document registration unit 140 of the document management server 10, when the document management server receives an ID-added document and document attribute of the ID-added document, will now be described. First, the document registration unit 140 registers the document content of the received ID-added document in the document DB 100, registers the meta information in the derivational relationship DB 110, and registers the document attribute of the received ID-added document in the document attribute DB 120. Subsequently, the derivational relationship registration unit 142 of the document registration unit 140 determines whether or not the meta information of the ID-added document includes a parent ID. When the meta information does include a parent ID, the derivational relationship registration unit 142 registers a tree number included in a record having the value of the parent ID as a management ID, as a tree number of the management ID of the received ID-added document in the record of this management ID. Further, the derivational relationship registration unit 142 generates a node number so as not duplicate any node numbers of other nodes having the same tree number, and then registers the generated node number as the node number of the management ID of the received ID-added document in the record of the management ID. When the meta information included in the received ID-added document does not include a parent ID, the derivational relationship registration unit 142 generates a new tree number that does not already exist in the derivational relationship DB 110, and then registers the generated tree number and a node number 0, representing that the node is a root node, in the record of the management ID of the received ID-added document. Subsequently, the derivational relationship registration unit 142 registers the management ID of the received ID-added document, in the pseudo derivational relationship DB 130, in association with the values registered as the tree number and the node number of the management ID of the received ID-added document. Further, the document attribute registration unit 144 of the document registration unit 140 registers the values registered as the tree number and the node number of the management ID of the received ID-added document in the document attribute DB 120 as the tree number and the node number of the management ID therein. In the example processing described here, a tree number and a node number are assigned to each management ID. Such assignment may simplify the later processing performed by the document management server 10. However, the assignment of the tree number and the node number can be omitted as long as the derivational relationship between a management ID and a parent ID are obtained, because information of tree structures can be obtained from the derivational relationship.

Figure 10:
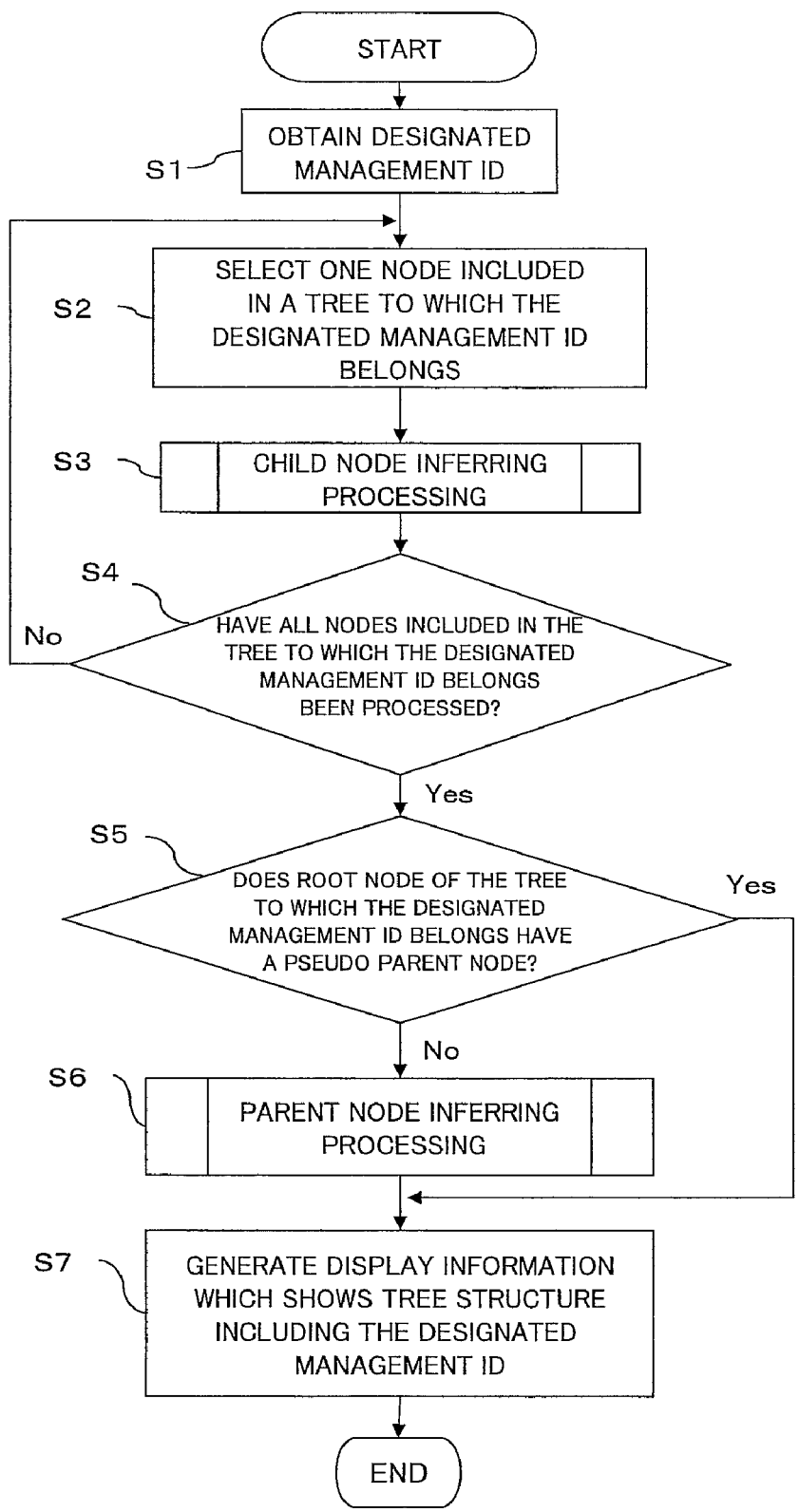
FIG. 10 is a flowchart showing an example processing procedure of a request processing unit.

An example processing to be performed by the derivational relationship inference unit 150 and the display information generating unit 154 when the document management server 10 receives a service request including a designated management ID from the client terminal 20 will now be described. Here, an example processing performed upon receipt of a service request for history information of a document corresponding to the designated management ID will be described. Referring to FIG. 10, in step S1, the derivational relationship inference unit 152 obtains a management ID designated in a service request that is received from the client terminal 20. Subsequently, in step S2, the derivational relationship inference unit 152 obtains, by referring to the pseudo derivational relationship DB 130, a tree number associated with the designated management ID, and selects a management ID (node) having the same tree number as the obtained tree number.

At step S3, the derivational relationship inference unit 152 performs a child node inferring processing regarding the node selected in step S2 as a node of interest. In the child node inferring processing, a node is inferred to be a node that could have been registered as a new document, even though the node was generated as a result of an operation with respect to the node of interest.

Figure 11:
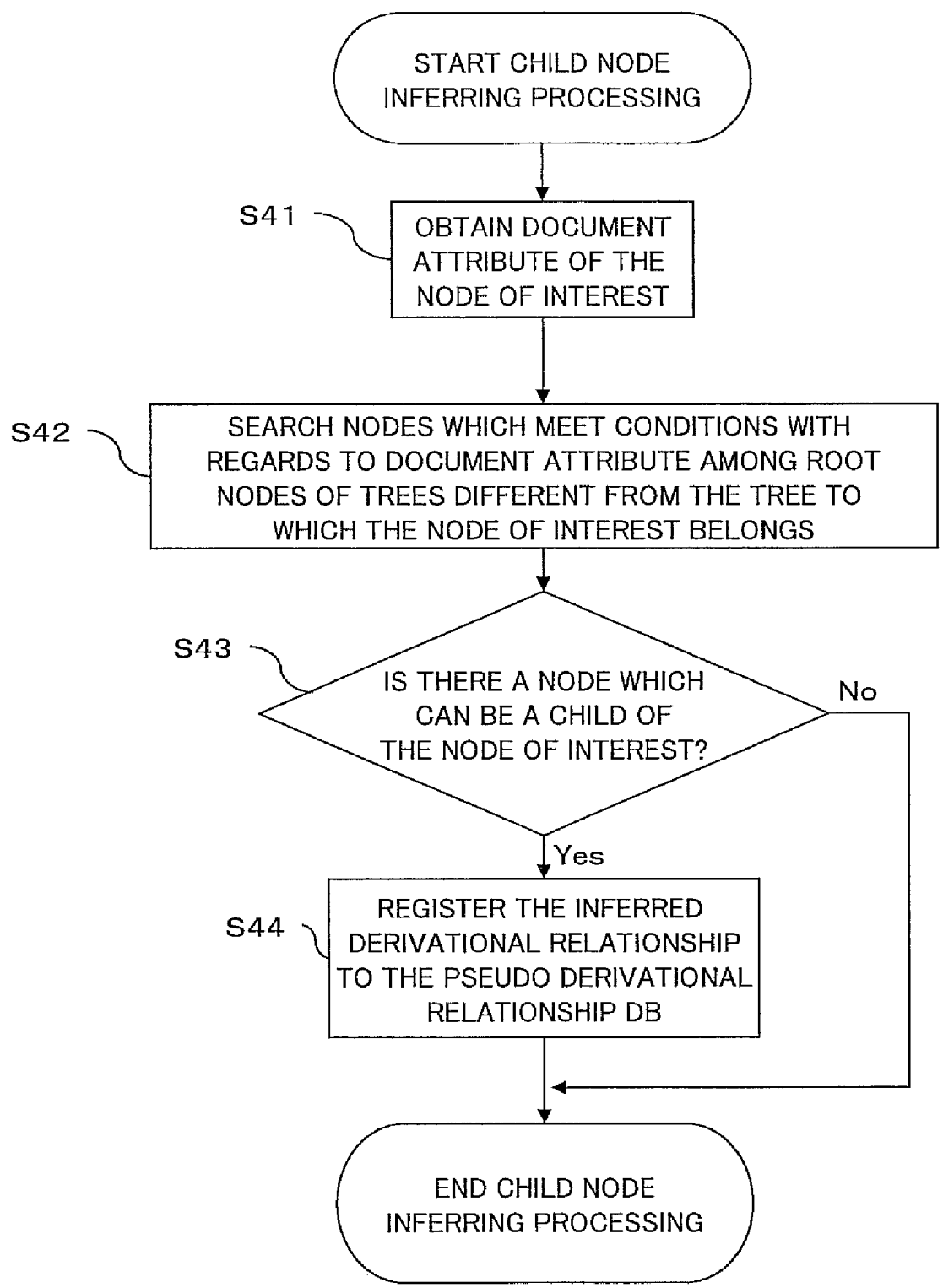
FIG. 11 is a flowchart showing an example processing procedure of a child node inferring processing to be performed by a derivational relationship inference unit.

FIG. 11 shows an example detailed procedure of the child node inferring processing in step S3. When the child node inferring processing in step S3 is started, a processing according to the example procedure shown in FIG. 11 is started. Referring to FIG. 11, first in step S14, the derivational relationship inference unit 152 obtains, by referring to the document attribute DB 120, document attribute of the node of interest. For example, in a case wherein the example content shown in FIG. 8 is registered in the document attribute DB 120, and wherein the node of interest selected in step S2 (FIG. 10) is a node having management ID "Doc5", the record corresponding to "Doc5" in the table shown in FIG. 8 is obtained.

Subsequently, in step S42, the derivational relationship inference unit 152 locates, by referring to the document attribute DB 120, document attribute records which meet the predetermined search conditions with respect to the document attribute among root nodes of trees different from the tree including the node of interest. That is, the derivational relationship inference unit 152 regards a node that has a different tree number from the tree number of the node of interest and has node number 0 as a search object node, compares the document attribute of the search object node and that of the node of interest, and, as a result of the comparison, extracts a search object node if the search object node meets the predetermined search conditions.

The search conditions to be defined here are conditions with respect to the content of the items included in the document attribute registered in the document attribute DB 120. For example, a search condition may be defined to extract a search object node that has the same content with respect to a certain item included in the document attribute as the node of interest has. Another example of a search condition may be to extract a search object node when a character string representing the content with respect to a certain item included in the document attribute of the node of interest and a character string representing the content with respect to the certain item of the search object node have common characters exceeding a certain percentage. Further, multiple search conditions may be combined into a single logical expression for application. According to a further example configuration of the search conditions, the search object nodes may be ranked based on the degree of similarity between the content of a certain item included in the document attribute of the node of interest and the content of a corresponding item included in the document attribute of the search object node, or based on the number of items included in the document attribute for which the content in the node of interest and the search object node is the same.

FIG. 12 shows an example of records extracted from the document attribute DB 120 and ranked, when the node with management ID "Doc5" is the node of interest, based on the following search conditions: "Extract a node whose file path name is the same as the file path name of the node of interest except for the file extension."; "Extract a node whose creation date and time is later than the creation time and date of the node of interest."; "Elevate the rank of a node whose creator is the same as the creator of the node of interest.": and "Elevate the rank of a node whose creation time and date is closer to the creation time and date of the node of interest." In the example shown in FIG. 12, three records having management IDs "Doc6", "Doc163", and "Doc978" are extracted. These records include, as items of document attribute, a file path name "/home/user/specification_v2. doc", which is the same as the file path name "/home/user/specification_v2. html" of "Doc5" except for the part of the file extension (.html), and include creation time and date later than the creation time and date "2006-09-20T12:00Z" of "Doc5". Further, referring to the example shown in. FIG. 12, of the record "Doc6" is ranked highest because the record includes the same creator "user1" as that of "Doc5" and has the creation time and date closest to the creation time and date, "2006-09-20T12:00Z", of "Doc5". The node with the highest rank among the nodes extracted in the search processing of step S42 ("Doc6" in the example shown in FIG. 12) is selected as a node which can be a child of the node of interest. When there is no node that meets the search conditions among the search object nodes, no node is selected as a node which could be a child of the node of interest.

Subsequently, in step S43, whether or not there exists a node which could be a child of the node of interest is determined. At step S43, if there exists a node selected as a node which can be a child of the node of interest as a result of the search processing in step S42, the processing proceeds to step S44. If, as a result of the search processing in step S42, a node selected as a node which can be a child of the node of interest does not exist, it is determined that a node which can be a child of the node of interest does not exist, and the child node inferring processing ends without performing the processing of step S44.

At step S44, the derivational relationship inference unit 152 registers the derivational relationship which has been inferred in step S42 in the pseudo derivational relationship DB 130. For example, as shown in FIG. 9, the pseudo tree number of "Doc5" is set to 1 and the pseudo parent node description is set to "tree: 0, node: 4".

Referring again to FIG. 10, when the child node inferring processing of step S3 ends, in step S4, it is determined whether or not all nodes included in a tree to which the designated management ID belongs have been processed. When there remain nodes which have not yet been processed, the processing returns to step S2 and the processing from step S2 to step S4 will be repeated. When all the nodes have been processed, the processing proceeds to step S5. In step S5, the derivational relationship inference unit 152 refers to the pseudo derivational relationship DB 130 and checks the pseudo derivational relationship flag of a root node (a node with node number 0) of a tree to which the designated management ID belongs. If the pseudo derivational relationship flag is FALSE, it is determined that there is no node inferred as a parent node of the root node, and the processing proceeds to a parent node inferring process of step S6. If the pseudo derivational relationship flag is TRUE, it is determined that there already is a node inferred as a parent node of the root node, and the processing proceeds to step S7.

Figure 13:
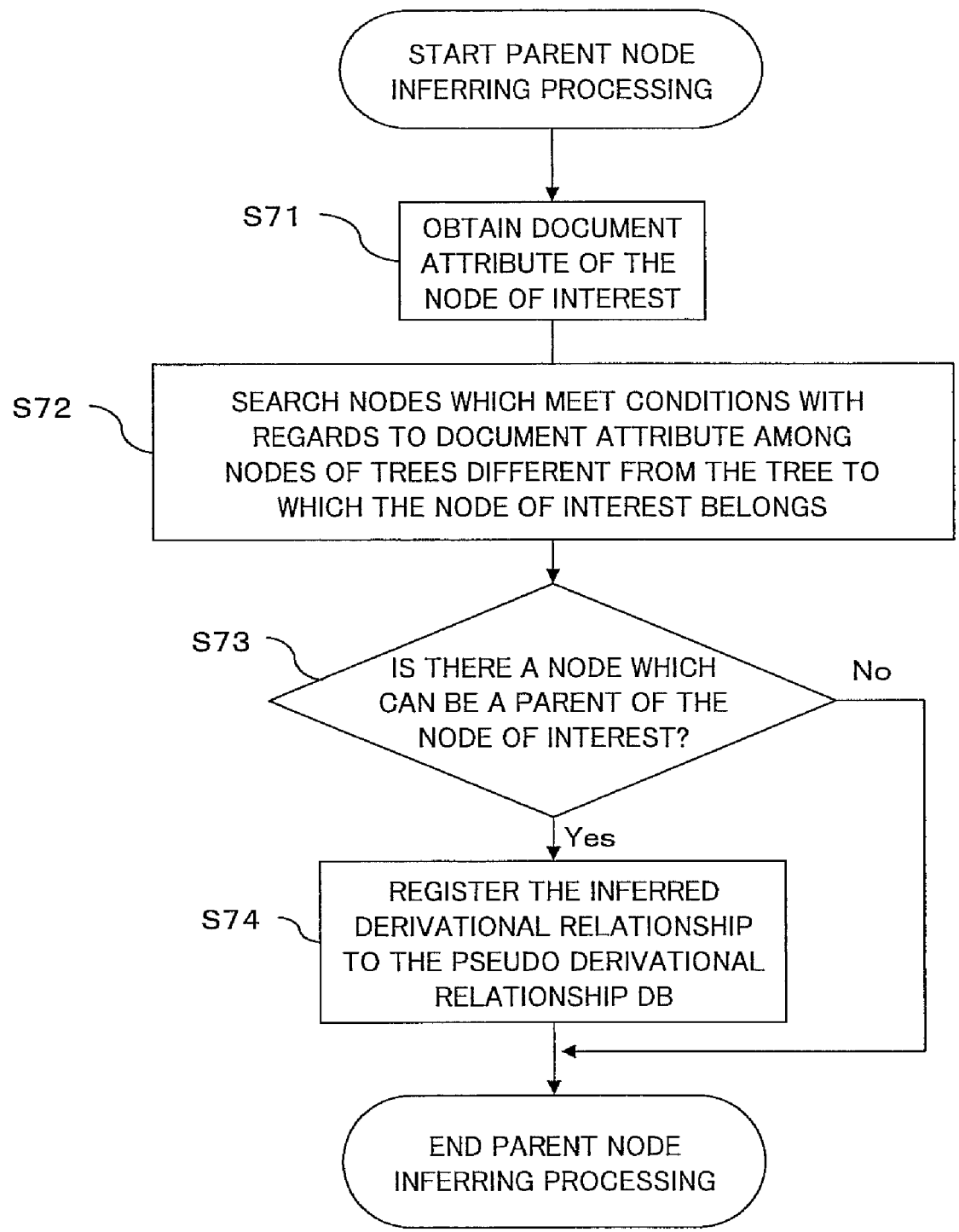
FIG. 13 is a flowchart showing an example processing procedure of a parent node inferring processing to be performed by the derivational relationship inference unit.

At step S6, the derivational relationship inference unit 152 performs a parent node inferring processing concerning the root node of the tree to which the designated management ID belongs as a node of interest. FIG. 13 shows an example detailed procedure of the parent node inferring processing in step S6. When the processing of step S6 is started, a processing according to the example procedure shown in FIG. 13 is started. Referring to FIG. 13, in the parent node inferring process, in step S71, the derivational relationship inference unit 152 obtains, by referring to the document attribute DB 120, document attribute of the node of interest. For example, in a case wherein the example content shown in FIG. 8 is registered in the document attribute DB 120, and where the root node of the tree to which the designated management ID belongs is a node of management ID "Doc1", the record corresponding to "Doc1" in the table shown in FIG. 8 is obtained.

Subsequently, in step S72, the derivational relationship inference unit 152 locates, by referring to the document attribute DB 120, document attribute records which meet the predetermined search conditions with respect to the document attribute among nodes of trees different from the tree including the node of interest. That is, the derivational relationship inference unit 152 regards a node having a tree number differing from the tree number of the node of interest as a search object node, compares the document attribute of the search object node with that of the node of interest, and, as a result of the comparison, extracts the search object node if the search object node meets the predetermined search conditions.

The search conditions to be set here are conditions with respect to the content of the items included in the document attribute registered in the document attribute DB 120, similar to the search conditions used in the child node inferring process of step S42 described referring to FIGS. 11 and 12. Here, the search conditions can be set to enable extracting, from among the search objects nodes, a node that is appropriate as a node which can be a parent node of the node of interest. For example, because the parent inferring process is a process wherein a node is inferred to be a node of a document from which a document of the node of interest derived, for a search condition with regards to creation time and date, it is reasonable to set the condition "Extract a node having the creation time and date earlier than the creation time and date of the node of interest." Further, similar to the search conditions used in the child inferring process described referring to FIGS. 11 and 12, the search conditions may be configured to rank the search object nodes. A node with the highest rank among the nodes extracted in the search processing in step S72 is selected as a node which can be a parent of the node of interest. When, in step S72, no node among the search object nodes meets the search conditions, no node is selected as a possible parent of the node of interest.

Subsequently, at step S73, whether or not there exists a node which could be a parent of the node of interest is determined. If it is found, at step S73, that there does exist a node selected as a result of the search processing in step S72 which could be a parent of the node of interest, the processing proceeds to step S74. If, however, as a result of the search processing in step S72, no node selected as a possible parent of the node of interest exists, it is determined that no node which could be a parent of the node of interest exists, and the parent node inferring processing ends without performing the processing of step S74.

At step S74, the derivational relationship inference unit 152 registers the derivational relationship which was inferred in step S72 in the pseudo derivational relationship DB 130.

Referring again to FIG. 10, when the parent node inferring processing of step S6 ends, the display information generating unit 154 generates, in step S7, display information schematically illustrating a tree structure including the designated management ID by referring to the derivational relationship DB 110 and the pseudo derivational relationship DB 130. The display information generated by the display information generating unit 154 is transmitted to the client terminal 20. The client terminal 20, according to the received display information, displays the tree structure including the designated management ID on a display.

Figure 14:
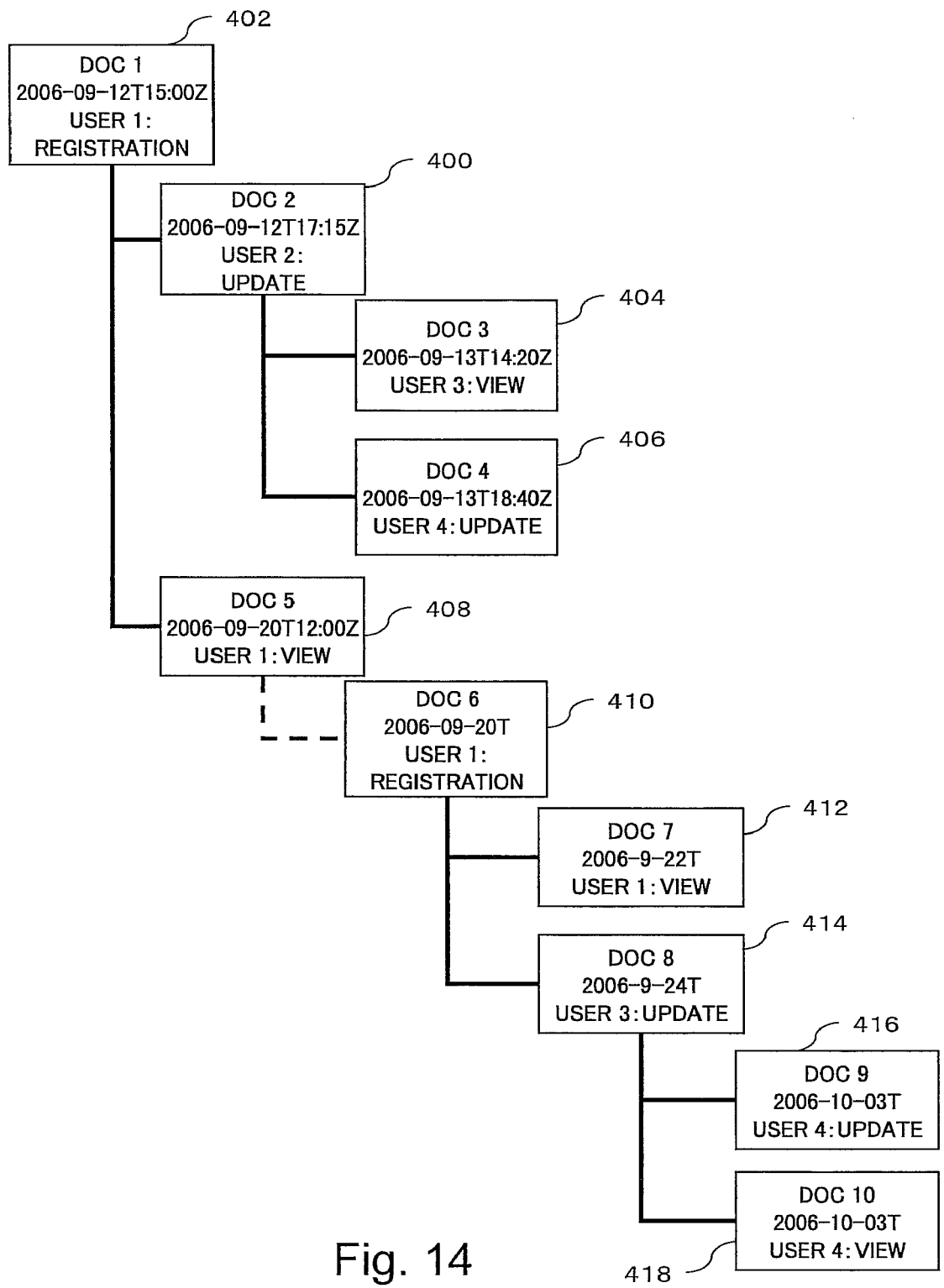
FIG. 14 is a view showing an example tree structure displayed on a display according to display information generated by a display information generating unit.

FIG. 14 shows an example view of a tree structure shown on a display of the client terminal 20 according to the display information generated by the display information generating unit 154. FIG. 14 shows an example view of a tree structure shown on a display of the client terminal 20, in a case wherein the example data content of the table shown in FIG. 5 is stored in the derivational relationship DB 110 and where the designated management ID is "Doc2". The example tree structure of derivational relationships shown in FIG. 14 includes: an icon 400 representing the designated management ID "Doc2"; icons 402, 404, 406, and 408 respectively representing "Doc1", "Doc3", "Doc4", and "Doc5" included in the tree which includes "Doc2" (tree number 0, refer to FIG. 5); and icons 410, 412, 414, 416, and 418, respectively representing "Doc6", "Doc7", "Doc8", "Doc9", and "Doc10". A tree structure of derivational relationships can be generated by referring to the derivational relationship DB 110 and the pseudo derivational relationship DB 130. In the example shown in FIG. 14, the derivational relationship between "Doc5" and "Doc6" which was inferred by the derivational relationship inference unit 152 of the document management server 10 and registered in the pseudo derivational relationship DB 130 is shown by a dashed line. The derivational relationships between other documents, that is, the derivational relationships which were received by the document management server 10 from the client terminal 20 and registered in the derivational relationship DB 110 are shown by solid lines. The display information generating unit 154 generates display information as to display the derivational relationships received from the client terminal 20 and the derivational relationships inferred by the derivational relationship inference unit 152 in different modes. The modes to display the derivational relationships received from the client terminal 20 and the derivational relationships inferred by the derivational relationship inference unit 152 are not limited to the example modes shown in FIG. 14. For example, the icons of the documents included in a tree including the designated management ID configured by the derivational relationships received from the client terminal 20 (icons 400 to 408 in the example shown in FIG. 14) and the icons of the documents included in a pseudo child tree inferred by the derivational relationship inference unit 152 can be displayed using different colors.

Here, in the example shown in FIG. 14, with respect to the icons 400 to 418 each of which representing a document, a management ID, operation time and date, an operator, and an operation type of corresponding document are shown as identifying information of each document. Information shown to identify each document can be obtained from the records registered in the derivational relationship DB 110. The items included in the information shown on an icon indicating each document to identify the document are not limited to the example items shown in FIG. 14.

The processing to be performed when a service request with respect to a service to display the history of a document corresponding to the designated management ID from the client terminal 20 is received has been described above. When a service request with respect to a service using derivational relationships other than a service to display the history of a document (e.g. a service to provide an updated document) is received, first, derivational relationships can be inferred by performing the process of step S1 to step S6 shown in FIG. 10, and then processing according to the service request may be performed using the derivational relationships registered in the derivational relationship DB 110 and the derivational relationships registered in the pseudo derivational relationship DB 130.

Figure 15:
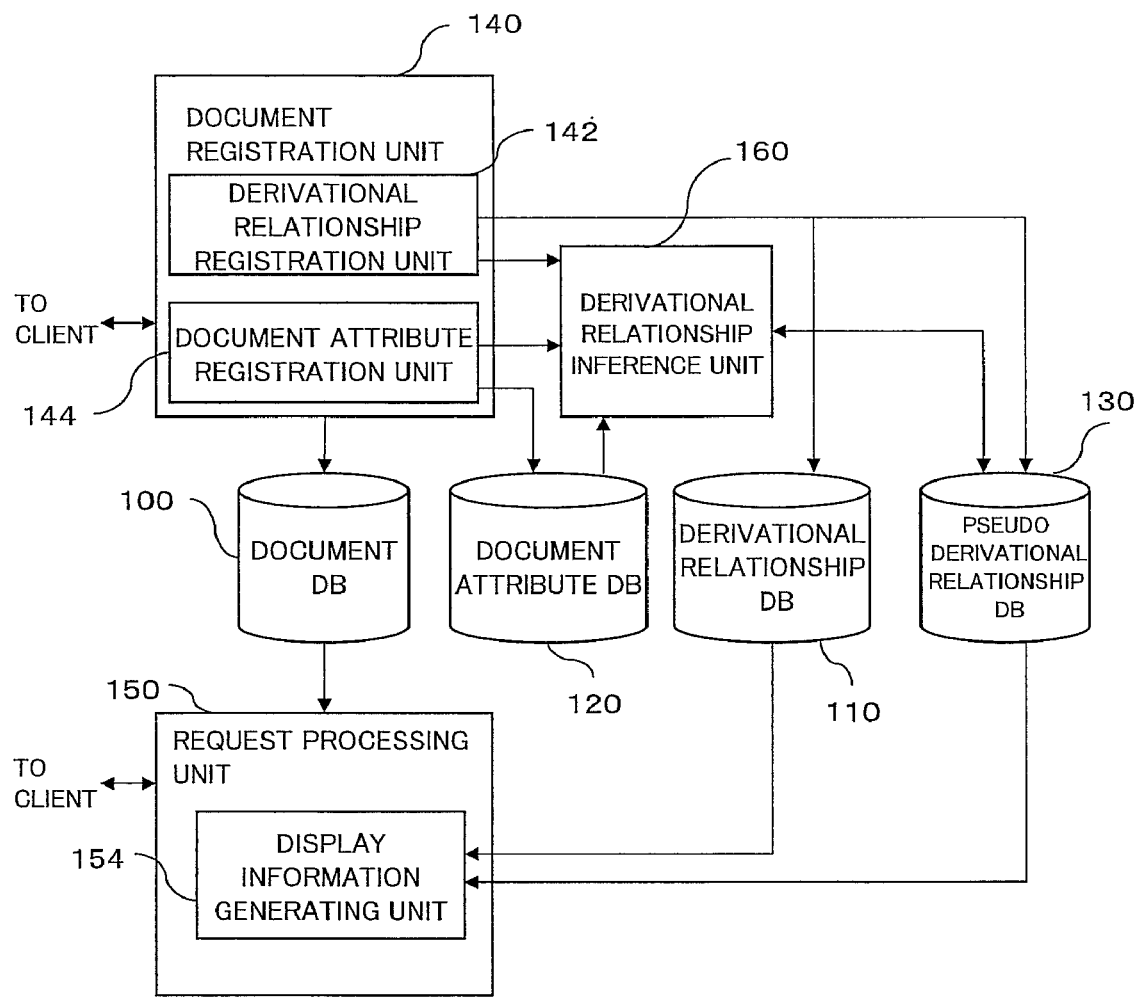
FIG. 15 is a block diagram showing another example internal structure of the document management server.

An exemplary embodiment, in which the derivational relationship inference unit 152 performs processing, according to the service request from the client terminal 20, with respect to a tree structure including a management ID for which the service is being request, has been described above. In another exemplary embodiment, when the client terminal 20 initially registers an ID-added document to the document management server 10, the document management server 10 may perform a processing to infer a document which can be a parent document of the initially registered document. FIG. 15 shows an example block diagram of the document management server 10 of an exemplary embodiment in which a derivational relationship inference processing is performed at the point of initial registration of an ID-added document. In FIG. 15, similar constituents as those shown in FIG. 4 are indicated by the same code as the corresponding constituents in FIG. 4 and the constitution and processing of those constituents will not be described in detail.

Referring to FIG. 15, the derivational relationship inference unit 160 obtains a management ID and document attribute of an ID-added document to be initially registered from, the derivational relationship registration unit 142 and the document attribute registration unit 144, respectively. Then the derivational relationship inference unit 160 performs processing to infer a document which can be a parent of the ID-added document to be initially registered, by referring to the document attribute DB 120 and pseudo derivational relationship DB 130.

An example processing performed by the document management server 10 illustrated in FIG. 15 when the document management server 10 receives an ID-added document and document attribute of the ID-added document from the client terminal 20 will now be described. First, the document registration unit 140 registers the document content included in the received ID-added document, meta information included in the received ID-added document, and the document attribute of the received ID-added document, in the document DB 100, the derivational relationship DB 110, and the document attribute DB 120, respectively. Along with such registration processing, the document registration unit 140 provides the meta information included in the received ID-added document and the document attribute of the received ID-added document to the derivational relationship inference unit 160. Subsequently, the derivational relationship registration unit 142 assigns a tree number and a node number with respect to the management ID of the received ID-added document, by performing similar processing as the processing of assigning a tree number and a node number described above with reference to FIG. 4, and further registers the assigned tree number and the assigned node number in the recode of the management ID in the derivational relationship DB 110. The document attribute registration unit 144 registers the tree number and the node number assigned by the derivational relationship registration unit 142 with respect to the management ID of the received ID-added document, in the record of the management ID in the document attribute DB 120.

When obtaining the meta information included in an ID-added document and the document attribute of the ID-added document from the document registration unit 140, the derivational relationship inference unit 160 refers to the operation type included in the log information of the meta information. If the operation type is a "registration" operation, the derivational relationship inference unit 160 executes parent node inferring processing to infer a node which could be a parent of the management ID (node). Here, the derivational relationship inferring unit 160 performs, regarding the node corresponding to the management ID of the obtained ID-added document as the node of interest, a process similar to the parent node inferring processing described above referring to FIG. 13, for example. However, if the operation included in the log information of the meta information in the obtained ID-added document is of a type other than a "registration" operation, the derivational relationship inference unit 160 does not perform the parent node inferring processing. Alternative to referring to the operation type included in the log information of the meta information within the ID-added document, the derivational relationship inference unit 160 may be designed to perform the parent node inferring processing when the meta information does not include a parent ID, and not to perform the parent node inferring processing when the meta information does include a parent ID.

In still another exemplary embodiment, instead of performing the parent node inferring processing with regards to an initially registered document every time a document is registered as a new document with the document management server 10, the derivational relationship inference unit 160 may execute the parent node inferring processing at a predetermined time interval with regard to the documents initially registered during that interval. For example, with respect to a document initially registered during the predetermined interval, a flag can be set in the record corresponding to the initially registered document in the derivational relationship DB 110, and, when the predetermined time has passed, the derivational relationship inference unit 160 may perform the parent inferring processing as shown in FIG. 13, regarding a node of the document for which the flag is set as the node of interest.

In the exemplary embodiments described above, an example case of what is actually a single series of derivational relationships being recognized as separate series of derivational relationships has been described as a situation wherein an operation is performed with respect to an ID-added document by non-conforming software, and then a document as a result of the operation is registered to the document management server 10. However, the methodology of the exemplary embodiments described above may be applied to cases other than the above-described example case. Another example of a portion of the series of derivational relationship being lost may be a situation wherein, despite the document operation unit 200 generating an ID-added document as a result of an operation, the ID-added document is not registered to the document management server 10 by the client terminal 20. One example of such a situation would be situations where the client terminal 20 is unable access the document management server 10, such as when there are problems with the network 30, the client terminal 20 and the network 30 are disconnected, the document management server 10 has some problems, and so on. For example, a case will be considered in which the client terminal 20 cannot access the document management server 10, and an operation is performed with respect to a document having a management ID "Doc1" and then a document having a management ID "Doc2" is generated, but the ID-added document having "Doc2" as a management ID and having "Doc1" as a parent ID is not registered to the document management server 10. If, thereafter, the document having a management ID "Doc2" is sent to another client terminal 20 which can access the document management server 10, and then, by this client terminal 20, an operation is performed with respect to the document "Doc2", an ID-added document having a management ID "Doc3" and a parent ID "Doc2" is generated, and further this document "Doc3" is registered to the document management server 10, although the document management server 10 can recognize that the document "Doc3" is derived from an unknown document "Doc2", the document management server 10 cannot interpolate as far as to recognize that the ancestor of the document "Doc3" is the document "Doc1". However, in this example case, the document management server 10 can recognize, at the point of the registration of the document "Doc3", that the document "Doc2" is not yet registered, thus the document management server 10 may temporarily regard the document "Doc3" as a root node. In this way, the document "Doc3" can be treated similarly to a document registered after an operation is performed by above described non-conforming software.

For example, as described above, in a case wherein no record having a management ID identical to a parent ID included in meta information in an ID-added document received by the document management server 10 from the client terminal 20 exists within the derivational relationship DB 110, the document registration unit 140 may set a flag, when registering a record of the management ID of the received ID-added document, the flag indicating that the document of the parent ID of this management ID is unknown. Then, a node of the management ID for which the flag is set can be treated similarly to a root node having no parent ID and the child node inferring processing or the parent node inferring processing as described above may be performed. For example, the child node inferring processing as described referring to FIG. 11 can be performed regarding root nodes with no parent IDs and nodes each for which the flag indicating that the document of the parent ID is unknown is set as the search object nodes in the processing of step S42. Further, for example, the parent node inferring processing as described referring to FIG. 13 can be performed regarding a node for which the flag indicating that the document of the parent ID is unknown as the node of interest.

Further, it is conceivable that, after the above described procedure, when the document management server 10 becomes available for the client terminal 20, an ID-added document so far has not been able to be registered can be registered to the document management server 10. As a result of such registration, a genuine derivational relationship is registered in the document management server 10, such that the stored pseudo derivational relationships can be deleted. An example procedure is as follows.

In a case wherein an ID-added document 300 is output by the document operation unit 200 when the client terminal cannot access the document management server 10, the registration processing unit 220 of the client terminal 20 may store the ID-added document 300 and document attribute of the ID-added document 300 in a temporary storage unit (not shown) of the client terminal 20. Thereafter, when it becomes possible for the client terminal 20 to access the document management 10, the registration processing unit 220 may register the ID-added document 300 stored in the temporary storage unit and the document attribute of the ID-added document to the document management server 10. When the client terminal 20 performs such processing, the document management server 10, when receiving an ID-added document from the client terminal 20, among the records within the derivational relationship DB 110 each for which the flag indicating the document of the parent ID is unknown is set, clears the flag with respect to a record having a parent ID identical to the management ID of the received ID-added document, as the document of the parent ID of such a record is no longer unknown to the document management server 10. Further, the derivational relationship inferred by the derivation inference unit with respect to the node of the record for which the flag is cleared is deleted from the pseudo derivational relationship DB 130.

In the exemplary embodiments described above, the issuing of management IDs is performed by the client terminal 20. Alternatively, the document management server 10 may issue management IDs. In this case, when an operation is performed with respect to an ID-added document, the client terminal 20 generates document data which does not include a management ID but which does include the management ID within the ID-added document prior to the operation as a parent ID 314, log information 316 concerning the operation, and a document content 320 obtained after the operation. Then the client terminal 20 transmits the generated document data along with document attribute obtained with respect to the document obtained after the operation to the document server 10. The document management server 10 issues a new management ID with respect to the received document data, registers this management ID and information included within the document data in the document DB 100, in the derivational relationship DB 110, and in the document attribute DB 120. Further, the document management server 10 generates an ID-added document by setting the issued management ID to the received document data, and returns the generated ID-added document to the client terminal 20. The client terminal 20 replaces the ID-added document prior to the operation by the received ID-added document. As described here, in a system in which the document management server 10 issues a management ID, processing similar to that performed in the above described exemplary embodiments can be performed.

In the exemplary embodiments and modified examples of the exemplary embodiments described above, an ID-added document including a management ID 312, a parent ID 314, log information 316, and a document content 320 is stored in the client terminal 20. Alternatively, the system can be designed such that the client terminal 20 retains only the management ID and that other information is stored in the document management server 10. In such a case, when an operation is performed with respect to a document by the client terminal 20, the client terminal 20 transmits a management ID corresponding to the document to the document management server 10 and obtains the document from the document management server 10.

Here, when the document management server 10 issues management IDs, the document management server 10 generates a management ID corresponding to the obtaining operation, provides the management ID in correspondence with the document to the client terminal 20, and further records log information concerning the obtaining operation (e.g. operation time and date and an operator), the original management ID (that is, a parent ID), and the issued management ID in the derivational relationship DB 110. The client terminal 20 replaces the management ID transmitted to the document management server 10 by the received management ID, and then opens the received document. A user may perform an operation such as viewing and editing with respect to the opened document. The client terminal 20, when an operation with respect to a document is completed, transmits to the document management server 10 the document generated after the operation, along with the management ID, log information concerning the operation, and document attribute obtained with respect to the document generated after the operation. The document management server 10 issues a new management ID with respect to the received document and registers the new management ID in the derivational relationship DB 110, and registers the received management ID as a parent ID in the derivational relationship DB 110. Further, the document management server 10 registers the received log information and the received document generated after the operation in the derivational relationship DB 110 and the document DB 100, and registers the received document attribute in the document attribute DB 120. Subsequently, the document management server 10 returns the newly issued management ID to the client terminal 20. The client terminal 20 replaces the original management ID with the received management ID. According to the above described processing, derivational relationships between operations are stored in the document management server 10.

On the other hand, when the client terminal 20 issues management IDs, the document management server 10 provides a document corresponding to a management ID received from the client terminal 20. The client terminal 20 opens the received document and a user performs an operation with respect to the document. After an operation is completed, the client terminal 20 issues a new management ID with respect to the document generated as a result of the operation, and transmits information similar to the above described ID-added document including the new management ID and document attribute obtained with respect to the document generated as a result of the operation to the document management server 10. Further, the client terminal 20 stores only the management ID included in the ID-added document and deletes other information included in the ID-added document.

The methodology of inferring derivational relationships in the exemplary embodiments described above can be applied to systems in which the client terminal 20 retains only the management IDs, and other information is stored in the document management server 10. That is, in any system in which derivational relationship information between documents generated by operations performed by the client terminal is notified to and recorded in the document management server 10, it is possible for the above described problem regarding the loss of derivational relationship information to occur, and such a problem can be addressed by the methodology of the above-described exemplary embodiments.

Figure 16:
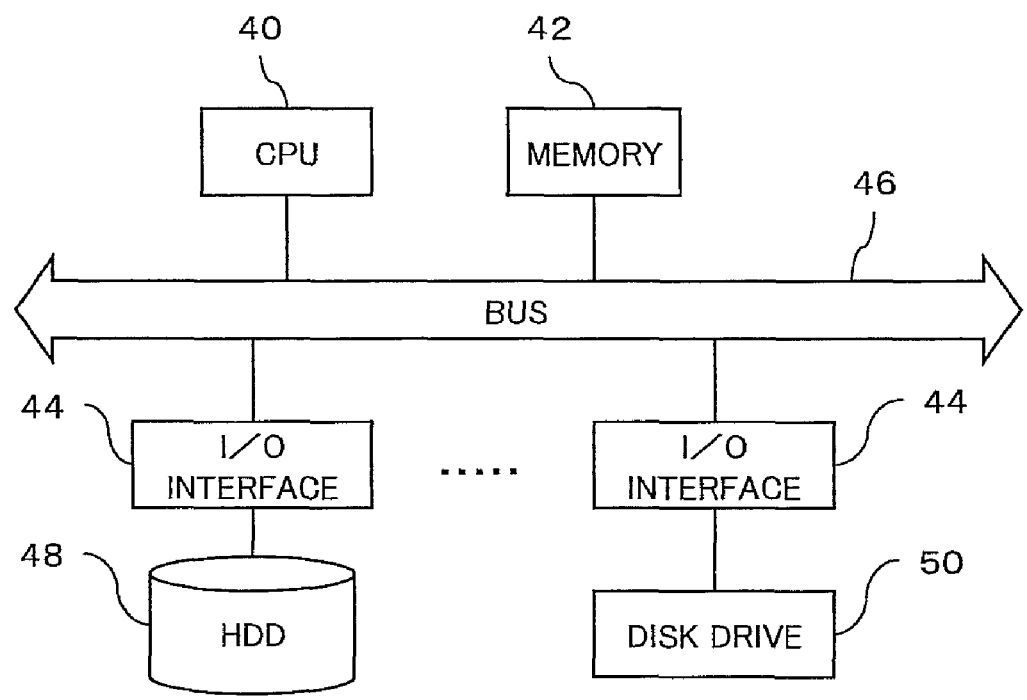
FIG. 16 is a view showing an example hardware structure of a computer.

The document management server 10 in the illustrated system described above is typically implemented by executing a program that describes the function or processing contents of each unit of the document management server described above by a general purpose computer. As shown in FIG. 16, the computer includes, as hardware, a circuit structure in which a CPU (central processing unit) 40, a memory (primary memory) 42, various I/O (input/output) interfaces 44, and so on are interconnected via a bus 46, for example. Further, a hard disk drive 48 and a disk drive 50 for reading a portable non-volatile recording medium, such as CDs, DVDs, and flash memory are connected, via the I/O interfaces 44, for example, to the bus 46. Such a drive 48 or 50 functions as an external storage device for the memory. The program that describes the processing contents of the exemplary embodiment may be stored in a fixed storage device such as the hard disk drive 48 via a recording medium such as a CD or DVD or via the network, and then installed in the computer. When the program stored in the fixed storage device is read into the memory and performed by the CPU, the processing of the exemplary embodiment is implemented. Similarly, the client terminal 20 can be implemented by causing a general purpose computer to execute the processes described in the document processing program as described above.

The foregoing description of the exemplary embodiments of the present invention has been provided for illustrative and descriptive purposes, and is not intended to be exhaustive or to limit the invention to the precise forms disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. A second information processing apparatus comprising:
    a receiving unit that receives from a first information processing apparatus a derivational relationship information item designating a document prior to an operation as a parent and a document after the operation as a child, and document attribute of the document after the operation;
    a derivational relationship storage unit that stores the derivational relationship information item that is received;
    a document attribute storage unit that stores the document attribute that is received;
    an inference unit that, based on a comparison between document attribute of a document which is a root of a tree structure of derivational relationships of documents represented by derivational relationship information items stored in the derivation storage unit and document attribute of a document included in the derivational relationship information items, infers a document that can be a parent document of the document which is the root of the tree structure, the compared document attributes being obtained from the document attribute storage unit; and
    a pseudo derivational relationship storage unit that stores, as a pseudo derivational relationship information item, derivational relationship information designating the document which is the root of the tree structure as a child and a document inferred by the inference unit to be a parent document of the root document as a parent, and that stores the pseudo derivational relationship information item distinctly from the derivational relationship items stored in the derivational relationship storage unit.

2. The second information processing apparatus according to claim 1, further comprising:
    a display information generating unit that generates display information diagrammatically showing a tree structure configured by the derivational relationship information items stored in the derivational relationship storage unit and by the pseudo derivational relationship information items stored in the pseudo derivational relationship storage unit, while showing, in the tree structure, derivational relationships represented by the derivational relationship items and derivational relationships represented by the pseudo derivational relationship items in different modes.

3. A computer readable medium, the process comprising:
    receiving from a first information processing apparatus a derivational relationship information item designating a document prior to an operation as a parent and a document after the operation as a child, and document attribute of the document after the operation;
    storing the derivational relationship information item that is received in a derivational relationshipe unit;
    storing the document attribute that is received in a document attribute storage unit;
    based on a comparison between document attribute of a document which is a root of a tree structure of derivational relationships of documents represented by derivational relationship information items stored in the derivation storage unit and document attribute of a document included in the derivational relationship information items, inferring a document that can be a parent document of the document which is the root of the tree structure, the compared document attributes being obtained from the document attribute storage unit; and
    storing in a pseudo derivational relationship unit, as a pseudo derivational relationship information item, derivational relationship information designating the document which is the root of the tree structure as a child and a document inferred by the inferring to be a parent document of the root document as a parent, while storing the pseudo derivational relationship information item distinctly from the derivational relationship items.

4. The computer readable medium according to claim 3, the process further comprising:

generating display information diagrammatically showing a tree structure configured by the derivational relationship information items stored in the derivational relationship storage unit and by the pseudo derivational relationship information items stored in the pseudo derivational relationship storage unit, while showing, in the tree structure, derivational relationships represented by the derivational relationship items and derivational relationships represented by the pseudo derivational relationship items in different modes.

5. An information processing system, comprising a first information processing apparatus and a second information processing apparatus, the first information processing apparatus including:

a derivational relationship information generating unit that, when an operation is performed with respect to a document, generates a derivational relationship information item designating a document prior to the operation as a parent and a document after the operation as a child;

a document attribute obtaining unit that obtains document attribute of a document; and a transmitting unit that transmits to the second information processing apparatus the derivation relation information item that is generated by the derivational relationship information generating unit and document attribute of the document after the operation that is obtained from the document attribute obtaining unit;

the second information processing apparatus including:

a receiving unit that receives from the first information processing apparatus the derivational relationship information item and the document attribute of the document after the operation;

a derivational relationship storage unit that stores the derivational relationship information item that is received;

a document attribute storage unit that stores the document attribute that is received;

an inference unit that, based on a comparison between document attribute of a document which is a root of a tree structure of derivational relationships of documents represented by derivational relationship information items stored in the derivation storage unit and document attribute of a document included in the derivational relationship information items, infers a document that can be a parent document of the document which is the root of the tree structure, the compared document attributes being obtained from the document attribute storage unit; and a pseudo derivational relationship storage unit that stores, as a pseudo derivational relationship information item, derivational relationship information designating the document which is the root of the tree structure as a child and a document inferred by the inference unit to be a parent document of the root document as a parent, and that stores the pseudo derivational relationship information item distinctly from the derivational relationship items stored in the derivational relationship storage unit.

6. An information processing method, comprising:

receiving from a first information processing apparatus a derivational relationship information item designating a document prior to an operation as a parent and a document after the operation as a child, and document attribute of the document after the operation;

storing the derivational relationship information item that is received in a derivational relationship storage unit;

storing the document attribute that is received in a document attribute storage unit;

based on a comparison between document attribute of a document which is a root of a tree structure of derivational relationships of documents represented by derivational relationship information items stored in the derivation storage unit and document attribute of a document included in the derivational relationship information items, inferring a document that can be a parent document of the document which is the root of the tree structure, the compared document attributes being obtained from the document attribute storage unit; and storing in a pseudo derivational relationship unit, as a pseudo derivational relationship information item, derivational relationship information designating the document which is the root of the tree structure as a child and a document inferred by the inferring to be a parent document of the root document as a parent, while storing the pseudo derivational relationship information item distinctly from the derivational relationship items.

* * * * *